US006983798B2

(12) United States Patent
Todd

(10) Patent No.: US 6,983,798 B2
(45) Date of Patent: Jan. 10, 2006

(54) METHODS AND FLUID COMPOSITIONS FOR DEPOSITING AND REMOVING FILTER CAKE IN A WELL BORE

(75) Inventor: Bradley L. Todd, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 320 days.

(21) Appl. No.: 10/379,856

(22) Filed: Mar. 5, 2003

(65) Prior Publication Data

US 2004/0173353 A1 Sep. 9, 2004

(51) Int. Cl.
*E21B 33/13* (2006.01)

(52) U.S. Cl. ....................... 166/282; 166/312; 166/278

(58) Field of Classification Search ................ 166/312, 166/278, 311, 282, 283; 175/72; 507/137, 507/267

See application file for complete search history.

(56) References Cited

U.S. PATENT DOCUMENTS 3,411,580 A 11/1968 McKinney et al. ........... 166/22
4,175,042 A * 11/1979 Mondshine .............. 166/305.1
5,728,652 A * 3/1998 Dobson et al. ............. 507/145
6,422,314 B1 * 7/2002 Todd et al. ................. 166/312
2001/0036905 A1 11/2001 Parlar et al. ................ 507/200

FOREIGN PATENT DOCUMENTS

EP 1 178 099 A2 2/2002
EP 1 223 207 A1 7/2002

OTHER PUBLICATIONS

Foreign Search Report and Opinion (PCT /GB2004/000685), Jun. 15, 2004.

* cited by examiner

*Primary Examiner*—John Kreck
(74) *Attorney, Agent, or Firm*—Robert A. Kent

(57) ABSTRACT

The current invention provides methods of using and drilling and servicing fluid compositions for depositing and removing filter cake from the walls of a well bore. The compositions make use of particulate solid bridging agent comprised of a salt of an organic acid. The bridging particles are dissolvable by a clean-up solution comprised of a mild solvent that is less corrosive than the conventional strong mineral acids used for this purpose.

20 Claims, No Drawings

METHODS AND FLUID COMPOSITIONS FOR DEPOSITING AND REMOVING FILTER CAKE IN A WELL BORE

BACKGROUND OF THE INVENTION

1. Field of the Invention

The present invention relates to well drilling and servicing fluids utilized in producing formations and the removal of filter cake deposited by the fluids in the formations.

2. Description of the Prior Art

The use of special fluids for drilling or servicing hydrocarbon producing formations penetrated by well bores is well known. When well bores are drilled into producing formations, drilling fluids are utilized which will minimize damage to the permeability of the formations and their ability to produce hydrocarbons. Servicing fluids are utilized when completion operations are conducted in producing formations and when conducting work-over operations in the formations. The drilling and servicing fluids deposit a layer of particles known as "filter cake" on the walls of the well bores within the producing formations. The filter cake prevents the drilling and servicing fluids from being lost into the formations and prevents solids from entering the porosities of the producing formations. The filter cake reduces operational costs by precluding the loss of fluids into the formation and preventing solids from entering the porosities of the formation. Following completion and prior to initiating production, the filter cake must be removed. Despite advances in the state of the art, filter cake removal remains a problem in the industry.

Drilling and servicing fluids usually comprise fluid loss control materials, a polymer solid suspending agent, and an acid soluble particulate solid bridging agent. One common bridging agent for bridging over formation pores is calcium carbonate. The filter cake formed by the drilling or servicing fluid includes the bridging agent, the polymeric suspending agent, and the fluid loss control material.

Heretofore the filter cake has been removed by contacting the filter cake with a strongly acidic solution for a period of time sufficient to dissolve the bridging particles and decompose the polymer. Despite current anti-corrosion steps, the strongly acidic solution often corrodes metallic surfaces and completion equipment such as sand control screens causing early failure of such equipment. The acidic solution may also be incompatible with the producing formation and cause damage thereto.

The specific gravity of calcium carbonate creates another problem for the operator. Drill solids and calcium carbonate have approximately the same specific gravity. As a result, conventional rig separation equipment, which relies in part on differences in specific gravity, is unable to remove the drill solids without also removing the bridging particles.

Thus, there are continuing needs for improved drilling and servicing fluids and methods of removing filter cake deposited by the fluids from producing formations.

SUMMARY OF THE INVENTION

The present invention provides improved methods and fluid compositions for depositing and removing filter cake from the walls of a well bore. The methods of treating a well bore are basically comprised of the following steps. A drilling or servicing fluid is prepared comprising water and bridging agent wherein the bridging agent is a salt of an organic acid and is substantially insoluble in the drilling or servicing fluid. The fluid may additionally comprise density increasing water soluble salts, a fluid loss control material, a polymeric suspending agent, and other common additives such as lubricants, clay control materials, defoamers, biocides and pH buffers. The bridging agent is substantially insoluble in the drilling or servicing fluid; however, it is dissolvable in a clean-up solution comprising water and solvents that are not corrosive to metal surfaces and completion equipment. During drilling or work-over operations, the bridging agent is deposited as a filter cake along the walls of a well bore. Following completion of these operations, the filter cake is contacted with a clean-up solution comprising water and a solvent for a sufficient period of time such that at least a portion of the bridging agent is dissolved. Preferably, the clean-up solution remains in contact with the filter cake for a period of time sufficient to remove the bridging agent from the walls of the well bore.

Another embodiment of the current invention provides a method of treating a well bore and additionally provides for separation of the drill solids from a drilling or servicing fluid. The drilling or servicing fluid is prepared comprising water and bridging agent wherein the bridging agent is a salt of an organic acid and is substantially insoluble in the drilling or servicing fluid. Preferably the salt of the organic acid has a specific gravity sufficiently different from drill solids to permit separation of drill solids from the fluid using conventional drill rig separation equipment such as desilters and hydrocyclones without significant removal of organic acid salt particulate.

The current invention also provides drilling or servicing fluid compositions comprising water and the salt of an organic acid that is substantially insoluble in the drilling or servicing fluid and is dissolvable in a clean-up solution. The clean-up solution comprises water and solvents that are not corrosive to metal surfaces and completion equipment.

The current invention also provides well bore filter cake compositions basically comprising a salt of an organic acid that is substantially insoluble in the drilling or servicing fluid and acts as a bridging agent.

The objects, features and advantages of the present invention will be readily apparent to those skilled in the art upon a reading of the description of preferred embodiments which follows.

DESCRIPTION OF PREFERRED EMBODIMENTS

1. Methods of Applying and Removing a Filter Cake

The current invention provides an improved method for applying and removing a filter cake from the walls of a well bore. The improved method eliminates or reduces the need for corrosive solvents thereby prolonging the service life of production equipment.

In a preferred embodiment, the method for applying and removing filter cake comprises the following steps. First, a drilling or servicing fluid is prepared using mixing procedures known to those skilled in the art. The drilling or servicing fluid comprises an organic acid salt particulate bridging agent that is substantially insoluble in the drilling or servicing fluid. The fluid may additionally comprise density increasing water soluble salts, a fluid loss control material, a polymeric suspending agent, and other common additives such as lubricants, clay control materials, defoamers, biocides and pH buffers. Preferably, the bridging agent is substantially insoluble in the drilling or servicing fluid. "Substantially insoluble" is defined herein as having a solubility of about 1% by weight or less in the drilling or servicing fluid at above-ground temperatures as well as at formation temperatures.

Next, during drilling or work-over operations, the bridging agent is deposited as a filter cake along the walls of a well bore. Following completion of these operations, filter cake removal is effected by contacting the filter cake with a clean-up solution for period of time sufficient to dissolve at least a portion of the bridging agent. The clean-up solution may also comprise polymer breakers such as oxidizers and enzymes. Typically, the clean-up solution is circulated downhole across the production interval and left to soak for periods of time ranging from about 2 to about 24 hours. In general, the operator will be able to determine a sufficient period of time has elapsed when the fluid loss rate from the well to the formation increases.

The water utilized in the drilling or servicing fluid composition of this invention can be fresh water or salt water depending upon the particular density or clay inhibition of the composition required. The term "salt water" is used herein to mean unsaturated salt water or saturated salt water including brines and seawater. Generally, the water is present in the drilling or servicing fluid compositions in an amount in the range of from about 35% to about 97% by weight thereof, more preferably from about 70% to about 90%.

Preferably, the bridging agent is dissolvable in a clean-up solution comprised of water and solvents that are not corrosive to metal surfaces and completion equipment. "Dissolvable" is defined herein to mean that the bridging agent can be completely solubilized, or alternatively, solubilized to the extent that the particles are sufficiently reduced in size to permit their removal from the formation with the clean-up solution. "Not corrosive" is defined herein as having a corrosion rate of about 0.05 $lbs/ft^2$ or less for the period of time for which the cleanup solution will be in contact with down hole equipment.

Bridging agents suitable for use in the method of the current invention include, but are not limited to, magnesium citrate, calcium citrate, calcium succinate, calcium malate, calcium tartrate, magnesium tartrate, bismuth citrate, and the hydrates thereof. The bridging agent utilized is generally present in the drilling or servicing fluid compositions in an amount in the range of from about 3% to about 40% by weight thereof, more preferably from about 5% to about 15%.

Generally the bridging agent particle size is in the range of from about 1 micron to about 600 microns. Preferably, the bridging particle size is in the range of from about 1 to about 200 microns but may vary from formation to formation. The particle size used is determined by the pore throat size of the formation. The preferred organic acid salts will be available in the desired particle size or as crystals or granules large enough to be ground to the desired particle size range.

The method of the current invention also provides for the separation of the drill solids from the bridging agent particles and drilling or treating fluid. Drill solids are generally comprised of sand fines or clay fines. Continuous separation of the drill solids from the fluid and bridging agent is desirable because drill solids remaining in the filter cake cannot be easily removed with either mechanical or chemical techniques.

In the method of the current invention, the bridging agent particles have a specific gravity sufficiently different from that of the drill solids to permit the use of equipment based on differences in specific gravity to separate the drill solids from the bridging agent particles. Since conventional rig separation equipment often operates on the basis of differences in specific gravity, the current invention will enable the separation of the bulk of the drill solids from bridging agents using currently available equipment. The specific gravity of commonly encountered drill solids is in the range of 2 to 5 with the bulk of the solids having a specific gravity greater than 2.5. Generally, the bridging agent has a specific gravity of 2.2 or less, and preferably the bridging agent has a specific gravity of 1.8 or less.

Solvents for the organic acid salt particulate solid bridging agent should readily dissolve the bridging agent without corroding the metal surfaces and completion equipment such as sand screens. Generally, the solvents can be organic esters, salts, mild acids or ammonium salts. Preferred solvents include, but are not limited to, salts or esters of ethylenediaminetetraacetic acid (EDTA), salts or esters of nitrilotriacetic acid, citric acid, salts or esters of citric acid, salts or esters of diglycolic acid, succinic acid and ammonium salts. More preferably, the solvent in the clean-up solution is salts or esters of EDTA. The solvent utilized is generally present in the clean-up solution in an amount in the range of from about 2% to about 20% by weight thereof, more preferably from about 5% to about 10%.

The drilling or servicing fluid composition may also comprise a density increasing water soluble salt. Suitable water soluble salts include, but are not limited to, sodium chloride, sodium bromide, potassium chloride, calcium chloride and calcium bromide.

The drilling or servicing fluid composition may also comprise a fluid loss control agent. A variety of fluid loss control agents can be utilized in the well drilling or servicing fluids of this invention, including, but not limited to, starch, starch ether derivatives, hydroxyethylcellulose, cross-linked hydroxyethylcellulose and mixtures thereof. A particularly suitable such fluid loss control agent is a non-ionic starch that is commercially available under the trade designation "N-Dril HT Plus™" from Halliburton Energy Services. Generally, a fluid loss control agent is present in the drilling or servicing fluid compositions in an amount in the range of from about 1% to about 3% by weight thereof, more preferably from about 1.5% to about 2.5%.

The drilling or servicing fluid composition may also contain a hydratable polymer solid suspending agent. A variety of hydratable polymer solid suspending agents can be utilized, including, but not limited to, biopolymers such as xanthan and succinoglycon, cellulose derivatives such as hydroxyethylcellulose and guar and its derivatives such as hydroxypropyl guar. Of these, xanthan is preferred and is available under the trade designation "N-Vis™" from Halliburton Energy Services. The polymer solid suspending agent is generally present in the drilling or servicing fluid compositions of this invention in an amount in the range of from about 0.1% to about 1% by weight thereof, more preferably from about 0.2% to about 0.4%.

The bridging agent particles are a permanent part of the drilling or servicing fluid; they are added when the fluid composition is made and are not removed prior to fluid disposal. Drill solids, on the other hand, become entrained in the fluid during the drilling process. Since drill solids can be very damaging to the formation, it is desirable to remove them. This can be accomplished after the drill fluid reaches the surface and before it is returned to the formation using conventional technology.

Thus, the preferred methods of this invention for depositing a filter cake along the walls of the well bore and subsequently dissolving the filter cake are basically comprised of the following steps: (a) preparing a drilling or servicing fluid composition as described above, (b) depositing a bridging agent from the fluid composition to provide at least a portion of the filter cake along the walls of the well bore, and (c) contacting the filter cake with a clean-up solution as described above to dissolve the bridging agent. Additionally, the method of the current invention provides for separation of the drill solids from the drilling or treating fluid containing the bridging agent particles.

2. Improved Drilling and Servicing Fluids

The preferred drilling or servicing fluid compositions of this invention are basically comprised of water and an organic acid salt particulate bridging agent that is substantially insoluble in the drilling or servicing fluid. When deposited on the well bore walls, the bridging agent forms a filter cake. In a preferred embodiment, the bridging agent is dissolvable by a mixture of water and solvents that are not corrosive to metal surfaces and metal completion equipment. Examples of such solvents include, but are not limited to, salts or esters of ethylenediaminetetraacetic acid, salts or esters of nitrilotriacetic acid, citric acid, salts or esters of citric acid, salts or esters of diglycolic acid, succinic acid and ammonium salts.

Suitable bridging agents for the drilling or servicing fluid compositions of this invention include, but are not limited to, magnesium citrate, calcium citrate, calcium succinate, calcium malate, calcium tartrate, magnesium tartrate, bismuth citrate, and hydrates thereof.

Preferable drilling and servicing compositions comprise a bridging agent present in an amount in the range of from about 10% to about 50% by weight of the composition, and more preferably from about 15% to about 25%. The specific gravity of the bridging agent in the composition is preferably less than about 2.2 and more preferably less than about 1.8. The bridging agent particle size is generally between 1 and 600 microns and preferably between 1 and 200 microns. Other components commonly found in drilling and servicing fluids such as described above in the previous section may also be included in the composition of the current invention.

3. Filter Cake Composition

The filter cake composition of this invention is generally comprised of particles of a salt of an organic acid that is substantially insoluble in the drilling or servicing fluid and acts as a bridging agent in the filter cake. Preferably, the filter cake composition is removable by contact with an aqueous clean-up solution comprised of water and solvents that are not corrosive to metal surfaces and completion equipment. For example, filter cake is preferably removed from the walls of the well bore when contacted by an aqueous clean-up solution comprised of water and a solvent selected from the group consisting of salts or esters of ethylenediaminetetraacetic acid, salts or esters of nitrilotriacetic acid, citric acid, salts or esters of citric acid, salts or esters of diglycolic acid, succinic acid, and ammonium salts.

Preferably, the filter cake compositions of this invention comprise bridging agents such as magnesium citrate, calcium citrate, calcium succinate, calcium malate, calcium tartrate, magnesium tartrate, bismuth citrate, and hydrates thereof. The specific gravity of the bridging agent in the filter cake composition is preferably less than about 2.2 and more preferably less than about 1.8. The bridging agent particle size is generally between 1 and 600 microns and preferably between 1 and 200 microns.

EXAMPLE 1

Table 1 shows the test conditions and results for solubilizing bridging particles formed from calcium citrate tetrahydrate. Calcium citrate tetrahydrate has limited solubility in water, but, as shown in the table below, it is adequately solubilized in solutions of dipotassium ethylenediaminetetraacetic acid as well as neutralized diglycolic acid. Thus, aqueous solutions of dipotassium ethylenediaminetetraacetic acid and sodium diglycolate are adequate clean-up solutions for the filter cakes containing calcium citrate tetrahydrate bridging particles.

TABLE 1

Summary of Calcium Citrate Solubility Tests

| Material | Recipe | Results (Time to dissolve) |
|---|---|---|
| Calcium citrate tetrahydrate | 50 mL water + 4.5 g K2EDTA + 1 g calcium citrate $4H_20$. Stir w/heat. | <15 minutes |
| Calcium citrate tetrahydrate | 50 mL water + 1.5 g diglycolic acid + neutralize to pH 7 with NaOH + 1 g calcium citrate $4H_20$. Stir w/ heat. | <15 minutes |
| Calcium citrate tetrahydrate | 50 mL water + 1.5 g IDA + neutralize to pH 7 with NaOH + 1 g calcium citrate $4H_20$. Stir w/ heat. | Did not dissolve |
| Calcium citrate tetrahydrate | 50 mL water + 4.5 g K2EDTA + 1 g calcium citrate $4H_20$. Stir w heat. | <5 minutes. |
| Calcium citrate tetrahydrate | 50 mls water + 1.5 g diglycolic acid + adjust pH to 10 with NaOH + 1 g calcium citrate $4H_2O$. Stir w/ heat. | 1 minute |

K2EDTA = Potassium Ethylenediaminetetraacetic Acid
IDA = Iminodiacetic acid

EXAMPLE 2

Similar solubility tests were run on other possible combinations of bridging particles and aqueous solutions of organic solvents. The procedure involved adding 1 gram of particulate bridging material to 50 mL of water containing the test solvent and stirring on a hot plate. Bridging particles, solvent and solvent strength are listed in Table 2 for each test. In each case shown in the table, the bridging particle material had limited solubility in water, but dissolved readily (less than 15 minutes) in aqueous solutions of solvent. Thus, all of the combinations shown in Table 2 are examples of suitable combinations of bridging particles and solvents for the clean-un solution.

TABLE 2

Examples of Suitable Bridging Particle and Solvent Combinations

| Bridging Particle Material | Solvent |
|---|---|
| Calcium citrate tetrahydrate | 10% Dipotassium ethylenediaminetetraacetic acid |
| Calcium citrate tetrahydrate | 3% Sodium diglycolate |
| Bismuth (III) citrate | 10% Dipotassium ethylenediaminetetraacetic acid |
| Calcium malate | 10% Dipotassium ethylenediaminetetraacetic acid |
| Calcium succinate monohydrate | 10% Dipotassium ethylenediaminetetraacetic acid |
| Calcium succinate monohydrate | 6% Ammonium chloride |
| Calcium succinate monohydrate | 4% Succinic acid |

Thus, the present invention is well adapted to carry out the ends and advantages mentioned as well as those that are inherent therein. While numerous changes can be made by those skilled in the art, such changes are encompassed within the spirit of this invention as defined by the appended claims.

What is claimed is:

1. A method of treating a well bore comprising:

preparing a drilling or servicing fluid composition comprised of water and a bridging agent wherein the bridging agent is a salt of an organic acid that is substantially insoluble in the drilling or servicing fluid;

depositing the bridging agent as a filter cake along the walls of the well bore; and contacting the filter cake with a clean-up solution comprising water and a solvent for a period of time sufficient to dissolve at least a portion of the bridging agent.

2. The method of claim 1 wherein the filter cake is contacted with the clean-up solution for a period of time sufficient to remove the bridging agent from the walls of the well bore.

3. The method of claim 1 wherein the water comprises at least one of the following: fresh water or salt water and is present in the drilling or servicing fluid composition in an amount in the range of from about 35% to about 97% by weight of the composition.

4. The method of claim 1 wherein the bridging agent is substantially insoluble in the drilling or servicing fluid and is dissolvable by solvents that are not corrosive to metal surfaces and completion equipment.

5. The method of claim 1 wherein the bridging agent comprises at least one of the following: magnesium citrate, calcium citrate, calcium succinate, calcium malate, calcium tartrate, magnesium tartrate, bismuth citrate, or hydrates thereof.

6. The method of claim 1 wherein the bridging agent is present in the drilling or servicing fluid composition in an amount in the range of from about 3% to about 40% by weight of the composition.

7. The method of claim 1 wherein the bridging agent particle size ranges from about 1 to about 600 microns.

8. The method of claim 1 wherein the bridging agent has a specific gravity of less than about 2.2.

9. The method of claim 4 wherein the solvent comprises at least one of the following: organic acids, organic esters, organic salts, ammonium salts, or mixtures thereof.

10. The method of claim 4 wherein the solvent comprises at least one of the following: salts or esters of ethylenediaminetetraacetic acid, salts or esters of nitrilotriacetic acid, citric acid, salts or esters of citric acid, salts or esters of diglycolic acid, succinic acid, ammonium salts, or mixtures thereof.

11. The method of claim 1 wherein the solvent is present in the clean-up solution in an amount in the range of from about 2% to about 20% by weight of the clean-up solution.

12. A method of treating a well bore and separating drill solids from the drilling or servicing fluid and bridging agent particles comprising:

preparing a drilling or servicing fluid comprised of water and a bridging agent wherein the bridging agent is a solid particulate salt of an organic acid;

depositing the bridging agent as a filter cake along the walls of the well bore;

separating and removing drill solids from the drilling or servicing fluid containing bridging agent; and contacting the filter cake with a clean-up solution comprised of water and a solvent for a period of time such that the bridging agent is at least partially dissolved thereby.

13. The method of claim 12 wherein the bridging agent particles have a specific gravity of less than about 2.2.

14. The method of claim 12 whereby conventional rig separation equipment is utilized to separate the bridging agent particles from the drill solids.

15. The method of claim 12 wherein the bridging agent is substantially insoluble in the drilling or servicing fluid and is dissolvable by solvents that are not corrosive to metal surfaces and completion equipment.

16. The method of claim 12 wherein the bridging agent comprises at least one of the following: magnesium citrate, calcium citrate, calcium succinate, calcium malate, calcium tartrate, magnesium tartrate, bismuth citrate, or hydrates thereof.

17. The method of claim 12 wherein the bridging agent is present in the drilling or servicing fluid composition in an amount in the range of from about 3% to about 40% by weight of the composition.

18. The method of claim 12 wherein the bridging agent particle size ranges from about 1 to about 600 microns.

19. The method of claim 12 wherein the solvent comprises at least one of the following: organic acids, organic esters, organic salts, ammonium salts, or mixtures thereof.

20. The method of claim 12 wherein the solvent comprises at least one of the following: salts or esters of ethylenediaminetetraacetic acid, salts or esters of nitrilotriacetic acid, citric acid, salts or esters of citric acid, salts or esters of diglycolic acid, succinic acid, ammonium salts, or mixtures thereof.

* * * * *